United States Patent [19]
Bradley

[11] Patent Number: 5,849,201
[45] Date of Patent: Dec. 15, 1998

[54] OXIDATION OF AROMATIC HYDROCARBONS

[75] Inventor: John P. Bradley, Lilburn, Ga.

[73] Assignee: MVA Inc., Norcross, Ga.

[21] Appl. No.: 867,345

[22] Filed: Jun. 2, 1997

[51] Int. Cl.$^6$ ................................. C02F 1/78
[52] U.S. Cl. ................ 210/752; 210/759; 210/760; 210/763; 210/909; 405/128; 588/218
[58] Field of Search ................ 210/748, 759, 210/760, 763, 752, 909; 405/128; 588/205, 218

[56] References Cited

U.S. PATENT DOCUMENTS

| | | | |
|---|---|---|---|
| 4,007,118 | 2/1977 | Ciambrone | 210/760 |
| 4,040,982 | 8/1977 | Basila et al. | 210/760 |
| 5,053,142 | 10/1991 | Sorensen et al. | . |
| 5,192,452 | 3/1993 | Mitsui et al. | 210/760 |
| 5,370,801 | 12/1994 | Sorensen et al. | . |

FOREIGN PATENT DOCUMENTS

| | | | |
|---|---|---|---|
| 0622 130 A1 | 11/1994 | European Pat. Off. | . |
| 163794 | 12/1981 | Japan | 210/760 |

OTHER PUBLICATIONS

"Material Safety Data for Titanium Hydroxide", Kemira, Inc. (1992).

Berrill, P. et al., "Development of an Ozonation Process for Degradation of Polyaromatic Hydrocarbons", *15th Annual Electrical Power Research Institute*, (EPRI), pp. 22–1–22–18 (1990).

Bradley, J. P. et al., "On–Site Treatment of RCRA Coal Tar Sludges and Soils from a Decommissioned Manufactured Gas Plant", *IGT Symposium on Gas, Oil and Enviromental Biotechnology*, pp. 1–22 (1995).

Fotou, G. P. et al., "Titania by Spray Pyrolysis for Photocatalytic Destruction of Organics in Aqueous Solutions", *The 5th World Congress of Chemical Engineering*, vol. IV, pp. 620–625 (1996).

Gates, D.D. et al., "Chemical Oxidation of Volatile and Semi–Volatile Organic Compounds in Soil," *Conference of Air and Waste Management Association*, San Antonio, Texas, (1995) [Abstract Only].

Hrubowchak, D. M. et al., "Characterization of Polycyclic Aromatic Compounds on Surfaces Using Ion–Beam–Induced Desorption and Multiphoton Resonance Ionization", *Anal. Chem.*, vol. 63, pp. 225–232 (1991).

Hsu, M. et al., "The Use of Ozone for the Removal of Residual Trichloroethylene from Unsaturated Soils", *Proc. Ind. Waste Conf.*, 48th, pp. 215–225 (1994) [Abstract Only].

Ick, T.Y. et al., "Micellar Solubilization of Polynuclear Aromatic Hydrocarbons in Coal Tar–Contaminated Soils", *Enviromental Science and Technology*, vol. 29, No. 2, pp. 3015–3021 (1995) [Abstract Only].

Jacoby, W. A. et al., "Heterogeneous Photocatalysis for Control of Volatile Organic Compounds in Indoor Air", *J. Air & Waste Manage. Assoc.*, vol. 46, pp. 891–898 (1996).

Kasi, M.P. et al., "Coal Agloflotation and Supercritical Wet Oxidation: Novel Remediation Techniques for Ultra–Cleaning of Contaminated Soils", *J. Hazard. Material*, vol. 35(1), pp. 17–30, (1993).

(List continued on next page.)

*Primary Examiner*—Peter A. Hruskoci
*Attorney, Agent, or Firm*—Jones & Askew, LLP

[57] ABSTRACT

A method for efficient, economical and rapid remediation of aromatic hydrocarbons, and especially polycyclic aromatic hydrocarbons (PAHs), in contaminated materials, such as soils, sludges, tars, sands and liquids using catalysts in conjunction with ozone, oxidants and surfactants. The method uses multistage catalytic oxidation to convert aromatic hydrocarbons into innocuous, biodegradable, or easily decomposed compounds such as carbon dioxide and carbonyl compounds, including but not limited to aldehydes, ketones, quinones and carboxylic acids. The method may be employed to treat dry and wet contaminated samples of large tonnage and offers an excellent alternative to incineration.

30 Claims, 6 Drawing Sheets

OTHER PUBLICATIONS

Kelley, R. L. et al., "Application of Fenton's Reagent as a Pretreatment Step in Biological Degradation of Polyaromatic Hydrocarbons", *Gas, Oil, Coal, and Enviromental Biotechnology III*, Akin et al. (eds), pp. 105–120 (1991) [Abstract Only].

Kocher, B.S. et al., "Single–Stage Remediation of Contaminated Soil–Sludge", *Energy Sources*, vol. 17, pp. 553–563 (1995).

Kocher, B.S. et al., "Supercritical Water Oxidation for Destruction of Polycyclic Aromatic Hydrocarbons", *Proc. Annu. Int. Pittsburgh Coal Conf.*, 11th, vol. 2, pp. 1030–1035 (1994) [Abstract Only].

Kovalenko, L.J. et al., "Microscopic Organic Analysis Using Two–Step Laser Mass Spectrometry: Application to Meteoritic Acid Residues", *Anal. Chem.*, vol. 64, pp. 682–690 (1992).

Martens, D. A. et al., "Enhanced Degradation of Polycyclic Aromatic Hydrocarbons in Soil Treated with an Advanced Oxidative Process–Fenton's Reagent", *J. Soil Contam.*, vol. 4, No. 2, pp. 175–190 (1995).

Park, J. W. et al., "Phenanthrene Removal from Soil Slurries with Surfactant–Treated Oxides," *Journal of Enviromental Engineering*, vol. 121, No. 6, pp. 430–437 (1995) [Abstract Only].

Seibel, F. et al., "Characterization of Degradation Products of PAH Contaminated Soil After Ozone Treatment", *Proceedings SPIE–Int. Soc. Opt. Eng. (Enviromental Monitoring and Hazardous Waste Site Remediation)*, vol. 2504, pp. 86–97 (1995).

Seidel, J.P. "Use of Ozone for the Oxidation of Polycyclic Aromatic Hydrocarbons in Soil", *Forschungszentrum Karlsruhe GmbH Technik and Umwelt (Germany), Inst. fuer Technische Chemie; Karlsruhe Univ. (T.H.) (Germany), Fakultaet fuer Chemie,* (1995) [Abstract Only].

Staehelin and Hoigne, *Environ. Sci. Tech.*, vol. 16, p. 676 (1982).

Suzdorf, A. R. et al., "Polycyclic Aromatic Hydrocarbons in the Enviroment: Sources, Profiles and Conversion Routes", *Chem. Sustainable Dev.*, vol. 2 (2–3), pp. 449–473 [Abstract Only].

Volkering, F. et al., "Influence of Nonionic Surfactants on Bioavailability and Biogradation of Polycyclic Aromatic Hydrocarbons", *Appl. Environ. Microbiol.*, vol. 61, No. 5, pp. 1699–1705 (1995) [Abstract Only].

Whelan, G. et al., "Oxidation of Recalcitrant Organics in Subsurface Systems", *Hazard. Waste Hazard. Mater.*, vol. 9(3), pp. 245–265 (1992) [Abstract Only].

Wojtowicz, J. A. (Consultant), "Ozone", *Encyclopedia of Chemical Technology*, 4th Edition, vol. 17, Kirk & Othmer, Eds., Wiley Inter–Science, Publishers, New York, pp. 953–994 (1996).

Yao, J. J. et al., "Use of In–Situ Ozonation for the Removal of PAHs from Unsaturated Soils", *Hazard. Ind. Wastes*, vol. 24, pp. 642–651 (1992).

Yao, J. J. et al., "Use of Ozone for the Oxidation of VOCs and PAHs in the Presence of Naturally Occuring Organic Matter", *46th Purdue Industrial Waste Conference Proceedings*, pp. 89–97 (1992).

Beltrán, F.J. et al., "Oxidation of Polynuclear Aromatic Hydrocarbons in Water. 4. Ozone Combined with Hydrogen Peroxide", *Ind. Eng. Chem. Res.*, vol. 35, pp. 891–898 (1996).

Beltrán, F.J. et al., "Oxidation of Polynuclear Aromatic Hydrocarbons in Water. 3. UV Radiation Combined with Hydrogen Peroxide", *Ind. Eng. Chem. Res.*, vol. 35, pp. 883–890 (1996).

Beltrán, F.J. et al., "Oxidation of Polynuclear Aromatic Hydrocarbons in Water. 2. UV Radiation and Ozonation in the Presence of UV Radiation", *Ind. Eng. Chem. Res.*, vol. 34, pp. 1607–1615 (1995).

Beltrán, F.J. et al., "Oxidation of Polynuclear Aromatic Hydrocarbons in Water. 1. Ozonation", *Ind. Eng. Chem. Res.*, vol. 34, pp. 1596–1606 (1995).

Wang, Chuan–Bao et al., "Synthesizing Nanoscale Iron Particles for Rapid and Complete Dechlorination of TCE and PCBs", *Environmental Science & Technology*, vol. 31, No. 7, pp. 2154–2156 (1997).

Bailey, Philip S., Ozonation in Organic Chemistry, *Olefinic Compounds*, vol. I, pp. 19–24, (1978).

Buhler, R.E. et al., Ozone Decomposition in Water Studied by Pulse Radiolysis 1. $HO_2/O_2-$ and $HO_3/O_3-$ as Intermediates, *J. Phys. Chem.* vol. 88, pp. 2560–2564 (1984).

Staehelin, J. et al., "Ozone Decomposition in Water Studied by Pulse Radiolysis 2. OH and $HO_4$ as Chain Intermediates," *J. Phys. Chem.* vol. 88, pp. 5999–6004, (1984).

Hater, Gary R. et al., "Field–Scale Demo. of Ozone Enhanced Solid–Phase Bioremediation of Coal Tar Contam. Soil," IGT Symp. on Gas, Oil & Environ. Biotech., Colorado Springs, CO, pp. 1–11, (1995).

Degradation of Parent PAHs in Aqueous Solution by $O_3$

FIGURE 5A — Benzopyrene, Mass = 252
FIGURE 5B — Pentacene, Mass = 278
FIGURE 5C — Dibenzopyrene, Mass = 302
FIGURE 5D — Phenanthrene, Mass = 178
FIGURE 5E — Pyrene, Mass = 202
FIGURE 5F — Chrysene, Mass = 228

OXIDATION OF AROMATIC HYDROCARBONS

TECHNICAL FIELD

This invention relates to an improved method of oxidizing and degrading aromatic hydrocarbons, including polycyclic aromatic hydrocarbons, in contaminated soils, sediments, and sludges using catalysts and solid, liquid and gaseous oxidants. This invention provides the first alternative to large scale incineration of contaminated soils, sediments, and sludges.

BACKGROUND OF THE INVENTION

Aromatic hydrocarbons, especially polycyclic aromatic hydrocarbons (PAHs) and other organic compounds found in association with PAHs, for example furans, are potent carcinogens and toxic contaminants. PAHs currently represent the most abundant man-made pollutant on earth. PAHs, associated compounds and other chemicals, especially those compounds with conjugated bond systems, contaminate soils, sediments and sludges and pose a major health risk. Many of these chemicals are implicated not only as potent carcinogens but also as teratogens and modulators of fertility in many organisms. Neat tar and blends of coal tars and other organic wastes contain high concentrations of aromatics, especially PAHs. Aromatic and polyaromatic pollutants associated with PAH-rich polluted sites include, but are not limited to, benzene, naphthalene, anthracene, phenanthrene, pyrene, coronene, ovalene, circumanthracene, fluorene, acenaphthene, acenaphthylene, fluoranthene, chrysene, benzo(a)-anthracene, benzo(b)-fluoranthene, benzo(k)-fluoranthene, benzopyrene, benzo(ghi)pyrene, ideno(1,2,3-cd)pyrene, and dibenzo(a,h)anthracene. Many of these pollutants have been identified by the United States Environmental Protection Agency (EPA) as dangerous contaminants in various sites.

More than fifty major sites in the United States that are highly contaminated with these compounds have been identified by the EPA. Additionally, others estimate that over 2,000 contaminated sites exist in North America. The removal of aromatic contaminants from soil, silt, sludge and liquids poses a difficult and potentially very expensive problem, particularly in light of the massive amounts of contaminated material at issue. Some of these sites have existed for over ninety years, yet remain unremediated for a lack of a rapid, effective and efficient method of removing PAHs on a massive scale involving hundreds of thousands of tons of contaminated material.

Remediation of PAHs is complicated by the following factors: (1) PAHs usually occur as complex admixtures of many different types of (poly)aromatic ring compounds both with and without side-chain alkylation and other ring functionality; (2) PAHs span an unusually broad mass envelope (80–450 atomic mass units (amu)); (3) PAHs exhibit a wide range of stabilities; and, (4) PAHs exhibit a wide range of chemical reactivities. A method that is capable of destroying one PAH molecule may be ineffective against another.

Traditional methods for removing PAHs include incineration and other thermal treatments using elevated temperatures. Incineration is attractive because, in principle, PAHs can be completely oxidized to carbon dioxide and water. However, incineration and other thermal treatments are expensive due to the energy required to generate the high temperatures used. Incineration produces air pollution and is especially undesirable in populated areas. Incineration also requires expenditures for air pollution control equipment to comply with increasingly stringent air pollution regulations.

Other methods for treating PAHs include fixation or encapsulation, bioremediation, and the use of solid-state chemical oxidants. Fixation and encapsulation methods do not destroy PAHs. Bioremediation has proven to be ineffective or marginally effective in degrading PAHs. Solid-state oxidants, for example persulfate, are similarly ineffective with respect to PAHs. Solid-state oxidants tend to be less powerful oxidants relative to what is required to cleave and oxidize aromatic ring systems and they interact poorly with PAHs in contaminated soils and sludges. Solid-state chemical oxidants tend to selectively attack the less stable, higher mass PAHs many of which have lower bond resonance energies. Additionally, solid-state oxidants are relatively expensive and large amounts are required to degrade PAHs thereby contributing to the very high cost of the process.

Ozone ($O_3$) is a triatomic allotrope of oxygen and is an extremely strong oxidizing agent. It can be produced through the dissociation of molecular oxygen by passing dry air or oxygen through an electric (corona) discharge or exposure of these gases to ultraviolet or shorter wavelength irradiation. Ozone is unique among the stable, industrially usable, safe, and environmentally acceptable oxidizing agents in that ozone has a half life on the order of minutes and can cleave and oxidize benzene and other aromatic ring structures including PAHs.

One pathway by which ozone breaks down aromatic ring compounds is 1,3-dipolar cycloaddition across the double bonds (P. S. Bailey, *Ozonation in Organic Chemistry*, Vols. 1 & 2, Academic Press, Inc., New York, 1978–1982; Yao and Masten, Proc. Ind. Waste. Conf. 46th, 1992). However, theoretically 1 ozone molecule per 1 aromatic ring is required for ring cleavage via cycloaddition, which means that at least 3 gm of ozone are required for about 1 gm of typical PAHs with 2–5 rings. This level of ozone consumption is not feasible for large scale remediation. Another ozone/PAH degradation pathway (in aqueous media) involves highly reactive free radicals (e.g. $HO_2$ and HO) which are expected to be more effective and require less ozone (Staehelin and Hoigne, Environ. Sci. Tech. 16:676, 1982; Buhler et al., J. Phys. Chem. 88:1560, 1984; Buhler et al., J. Phys. Chem. 88:5999, 1984). Ozone requirements for this pathway are unknown and difficult to predict because of the complexity of the free radical reaction pathway itself, and the wide variation in the physical nature of the materials at such contaminated sites (e.g. liquors, oils, soft tars, hard tars (bitumens), sludges, sands, soils, coal fines, and coke fines) in which PAH concentrations can be as high as 15 wt % (150,000 ppm) in some contaminated materials.

A study which considered ozone for remediating sites heavily contaminated with PAHs in tailings from a coal/oil agglomeration process concluded that "a commercially feasible ozonation process must reduce the ozone requirement, not only to reduce operating cost, but also to provide a more manageable system for on-site remediation applications" (Berrill and Walia, pp 22-1 to 22-18, 15th Annual Electrical Power Research Institute (EPRI) Conference on Fuel Science, EPRI, Palo Alto, Calif., 1990). A laboratory study of an "ideal" soil spiked with only one PAH (phenanthrene) showed that 25 mg of ozone was required to degrade 1 mg of phenanthrene (Yao and Masten, Hazard. Ind. Wastes, 24:642–651, 1992). Another study of a similar "ideal" soil sample spiked with phenanthrene implied that as little as 1.1 mg of ozone was required to degrade 1 mg of phenanthrene (Yao and Masten, 46th Purdue Industrial Waste Conference Proceedings, Lewis Publishers, Inc., Chelsea, Mich., pp. 89–97, 1992). However, both studies indicated that other PAHs, for example pyrene and chrysene, require considerably higher levels of ozone, and that when multiple PAHs are present together (as they always are at contaminated sites) ozone dosage must be increased substantially to achieve the same levels of PAH degradation. Using linear regression analysis, Hater et al. estimated that, in principle, 1 mg of ozone will remove 1.3 mg of "total" PAHs and 0.47 gm of "carcinogenic" PAHs (3–6 membered rings) from soils containing up to 3000 ppm PAHs from a former manufactured gas plant (MGP) site. Further complicating the assessment of remediation efficiency is the high variability of results obtained with EPA methods. EPA method 8270 tends to underestimate the levels of PAH contamination in complex blends of materials such as waste streams.

Results indicate that EPA Method 8270 underestimates the levels of PAH contamination in blended material, and that actual levels of total PAHs may be a factor of 2 or more higher. It has been found that EPA Method 8270 yields highly variable results with heavily PAH-contaminated soils and sediments, presumably because of sample heterogeneity, and complex soil and sediment matrix effects. Simply by increasing the solvent extraction time beyond that specified in Method 8270, 1.56 times more fluorene (166 amu), 3.57 times more phenanthrene (278 amu), and 2.94 times more pyrene (202 amu) can be extracted from a coal-tar sludge from a former manufactured gas plant.

The actual amounts of ozone required to remediate PAHs in contaminated material are expected to vary widely from one contaminated site to another, and may be considerably higher, depending on the levels of contamination and the physical state of the PAHs, e.g., solid vs. liquid. Apart from the high cost of producing this amount of ozone, it is unclear whether the large ozone generating capacity (for example, ozone:PAH=3:1 w/w) is available for treating high tonnages of contaminated material. Second, at least two hours of direct ozone exposure may be required to destroy some PAHs, virtually prohibiting continuous treatment and instead requiring more expensive batch treatment processes. Third, the above constraints of ozone generating capacity and contact time mean that a typical contaminated site would require years to clean up.

There remains a long felt, yet unfulfilled need for a rapid and economical alternative to large-scale incineration as a method of effectively remediating material contaminated with PAHs and other organic compounds with conjugated bond systems. With its potential ability for complete destruction of PAHs, incineration may go well beyond what is required to render PAHs environmentally "safe". Incineration is expensive, produces other environmental problems and requires high amounts of energy.

The environmental impact of PAHs depends on leachability of the PAHs. For example, asphalt on roadways is known to contain large concentrations of free PAHs which are considered highly carcinogenic and teratogenic, however asphalt is considered an environmentally safe material because the PAHs in asphalt are simply not leachable.

What is needed is a method which provides excellent oxidation and destruction of a wide variety of PAHs and results in relatively environmentally safe and/or biodegradable oxidation products. What is also needed is a method of rapid oxidation of PAHs with rapid kinetics and minimal ozone/PAH contact time to permit rapid or continuous treatment of large tonnages of contaminated material found in soil, sludge, slurries, suspensions, liquids, water, organic solutions and aqueous solutions. What is also needed is a method requiring a minimum consumption of ozone per weight of PAH-contaminated material such that existing ozone generation technology can be used for continuous processing of PAH-contaminated material. What is also needed is a method which can be applied to clean the large tonnages of contaminated material found at many sites. What is also needed is a method which provides volume and mass reduction of the treated material, facilitates rapid or continuous processing of contaminated material, and eliminates the need for disposal of excess tonnage of treated material resulting from the remediation process.

SUMMARY OF THE INVENTION

The present invention provides a method for efficient, economical, and rapid remediation of materials, especially soils and sludge, contaminated with aromatic hydrocarbons, especially PAHs. The present method provides a method for remediating material contaminated with aromatic hydrocarbons, comprising: combining material contaminated with aromatic hydrocarbons, the material being less than approximately one-half inch in particle size, and water, catalyst, a first oxidant other than ozone, and at least one surfactant to the material to form a mixture; mixing the mixture; and adding ozone gas to the mixture. This novel method of the present invention employs a combination of a solid-state catalyst(s) in conjunction with ozone, oxidants, and surfactants. The method of the present invention is useful for the remediation of aromatic hydrocarbons, especially PAHs, on a very large scale including but not limited to treatment of contaminated landfill sites, dumps, sludges, beaches, sand, clay, dirt, silt, ponds, lagoons, aquifers and lakes. The present invention provides a beneficial method to remediate PAHs in sites contaminated by the petrochemical industry and by petrochemical products.

In one embodiment of the present invention, this method employs a mixing column in which the remediation occurs. Using the reactants of the present invention, less than about 1 part by weight of ozone per 1 part by weight of PAHs in a blend of tar, coal and coke fines, and tar-contaminated soil containing more than 1.3% (13,000 ppm) by weight of PAHs is required to effect more than 95% reduction in total PAHs. Less than 1.5 parts by weight of ozone per 1 part by weight of PAHs is required to effect more than 99% reduction in total PAHs.

The method of the present invention utilizes surfactants, oxidants, and agitation to transfer PAHs in contaminated materials of less than approximately one-half inch in particle size to the aqueous phase, where they are more accessible to direct attack by ozone in conjunction with multistage catalytic oxidation to convert PAHs into innocuous and/or biodegradable compounds, such as carbon dioxide, water, and carbonyl compounds, including but not limited to aldehydes, ketones, quinones and carboxylic acids.

The method of the present invention may also be used to treat PAH-contaminated liquids in which case crushing or grinding of the material to achieve a particle size is not required. Two of the catalysts used in the present invention, finely divided metals, such as metallic iron (or iron alloys), and the metal oxide, nano-titania, have not previously been used in conjunction with ozone for degrading organic compounds.

The general method of the present invention is presented follows. In one embodiment of the present invention, PAH-contaminated material, such as sand, soil, sludge or aggregate is blended and crushed to achieve a particle size of less than approximately one half inch. In cases where the PAH-contaminated material is present in very fine grains, or when the PAH-contaminated material is in liquid, crushing is unnecessary. After blending and crushing the PAH-contaminated material, water, first oxidants, surfactants, and catalysts are combined with the contaminated material to form an aqueous mixture which is mixed. When the PAH-contaminated material is liquid, addition of water and surfactant may be optional. The first oxidant is "pre-ozone treatment". A desirable oxidant is hydrogen peroxide, although other oxidants, including but not limited to perchlorate, permanganate and persulfate may be used. As peroxide reacts with the organic materials, the organic materials release heat and foam up as carbon dioxide and other gases resulting from the oxidation of the least stable organics that are emitted. This gaseous emission and foaming facilitate physical separation of the tar-containing organics from the inorganic solids and also facilitate transfer of the organics to the aqueous phase where they are directly accessible to ozone gas. This oxidation pre-ozone treatment serves to oxidize the most easily oxidizable hydrocarbons (i.e., those that can be remediated with oxidants other than ozone), thereby decreasing both the amount of ozone and the contact time required to further oxidize the contaminated material in the subsequent ozonation step. The catalysts, such as finely divided metals, include but are not limited to metallic iron, and also the metal oxide, nano-titania. The mixture is then contacted with ozone gas. Desirably the mixture and ozone are contacted in a mixing apparatus that provides rapid and vigorous agitation to optimize interaction of reactants, increase the rate of reaction and minimize the time required to oxidize the PAHs to acceptable levels.

A base, such as sodium hydroxide, may be optionally added to the mixture. This optional addition of base is desirable if the mixture is acidic since ozone treatment is more effective under slightly basic conditions. It is to be understood that the pH conditions of the contaminated material will determine if base is to be optionally added.

Application of heat and/or pressure may be optionally used in the practice of the present invention in order to accelerate the reaction. Heat may be applied to the mixture, to the reactants and to the mixing chamber or reaction column. Heat may be applied at temperatures up to 100° C.

It is an object of the present invention to provide an improved method of treating material contaminated with PAHs.

It is another object of the present invention to provide an efficient and economical method of treating toxic and hazardous material contaminated with PAHs and other organic compounds including but not limited to aliphatics.

It is a further object of the present invention to provide a method for large scale treatment of contaminated soil, sludge, sand, slurry and liquids in contaminated sites.

It is an another object of the present invention to provide an efficient and economical method to treat material, such as soil contaminated with PAHs and other organic compounds, which does not create toxic by-products.

Another object of the present invention is to provide an efficient and economical method to treat material, such as soil contaminated with PAHs and other organic compounds, which does not create undesirable gaseous emissions.

These and other objects, features and advantages of the present invention will become apparent after a review of the following detailed description of the disclosed embodiments and the appended drawings and claims.

BRIEF DESCRIPTION OF THE FIGURES

FIG. 2 shows electron energy-loss spectra of the titanium-L edges (FIG. 2a) and oxygen-K edges (FIG. 2b) in nano-titania and demonstrates that peak structures in the spectra which reflect the atomic bonding and valence band structure of nano-titania are different than anatase and rutile. The vertical arrows highlight left- and right-handed asymmetry of the eg peaks in rutile and anatase, respectively. Nano-titania has a symmetrical eg peak, indicating that it is different from the other forms of $TiO_2$.

DETAILED DESCRIPTION OF THE INVENTION

The term "polycyclic aromatic hydrocarbons" (PAH) as used herein means those hydrocarbon compounds containing more than one aromatic ring. It is to be understood that these aromatic rings may be substituted and may contain alkyl groups. The term PAH, as used herein, includes other aromatics and organic compounds with conjugated bond systems. Thus, the term PAH, as used herein, refers generally to toxic or hazardous aromatic compounds, and complex mixtures thereof. These compounds and complex mixtures are often associated with contaminated material.

The term "contaminated material" as used herein means any material contaminated with aromatic hydrocarbons and PAHs. Contaminated materials include, but are not limited to, soil, silt, permafrost, sand, clay, tar, asphalt, wood, concrete, plastic, fabric, nonporous media such as vermiculite, clothing, ceramics, sludge, slurries, suspensions, liquids, water, fresh water, salt water, ice, snow, organic solutions and suspensions, aqueous solutions and suspensions, solvents, chemicals, paints, and mixtures thereof.

The term "metal" as used herein means any metal, metal oxide, or metal alloy, that can remain unoxidized or achieve a transition to a higher oxidation state(s). Metals include, but are not limited to iron, silver, copper, cobalt, gold, manganese, nickel, stainless steel, steel wool and combinations thereof. Oxides of these metals, including band gap and non-band gap metal oxides, can also be employed. Iron is a preferred metal of the present invention. The term metal includes composites of the metals, metal oxides and metal alloys described in this paragraph. Nano-titania is a preferred metal oxide of the present invention.

Surfactants facilitate transfer of PAHs to the aqueous phase and include, but are not limited to, bi-terpene, soaps, solvents, supercritical fluids including but not limited to supercritical $CO_2$, detergents, degreasers, and releasing agents. Surfactants include those surfactants commonly used by one of ordinary skill in the art.

Oxidants of the present invention include those oxidants known to one of ordinary skill in the art, including but not limited to, hydrogen peroxide, perchlorate, permanganate, and persulfate.

The term "catalyst" as used herein means any material which accelerates the reaction of ozone or other non-ozone oxidants with PAHs in the contaminated material. Catalysts facilitate ring cleavage of aromatic hydrocarbons. Catalysts useful in the practice of the present invention include, but are not limited to metals, metal oxides, metal alloys, nano-titania and mixtures thereof.

The term "nano-titania" has been coined to describe a particular titania catalyst that has been found to be a superior catalyst compared to previously available titanium oxides ($TiO_2$). Nano-titania is a metal oxide. Nano-titania is available from Kemira, Inc. (Savannah, Ga.) under the trade names UNITi 907 and UNITi 908, and is described by the company as being titanium hydroxide ($Ti(OH)_4$). After extensive physical and chemical characterization, it is believed that nano-titania is not $Ti(OH)_4$, but a form of $TiO_2$ as explained below. It has been determined experimentally that nano-titania has an average crystallite size of 50–70 Å diameter and a surface area fifty times greater than other forms of titania, such as anatase, used for catalytic oxidation. Use of electron energy loss spectroscopy reveals that the atomic bonding and/or electronic band structure of nano-titania is distinct from those of anatase and rutile, the two major forms of titania (FIG. 2), even though the crystallography of nano-titania is similar to anatase. It has been determined experimentally that nano-titania is an even more effective catalyst when combined with metallic iron. Two commonly available structural polymorphs of $TiO_2$ are anatase and rutile. Both of these polymorphs have exactly the same compositions and stoichiometry and only slightly different crystal structures (the ratios of edge- and corner-sharing $TiO_6$ octahedra are different in each), yet anatase is known to be a more effective catalyst than rutile for decomposing organic compounds. Anatase and rutile are band gap materials and their catalytic activity towards organics is related to the magnitude of their respective band gaps. The band gaps of anatase, rutile, and nano-titania were experimentally determined to be 3.1, 2.5, and 3.3 eV, respectively.

X-ray and electron diffraction studies suggest that nano-titania is structurally (crystallographically) similar to anatase. It has been determined experimentally that nano-titania has a surface area about 50 times greater than commercially available, catalyst-grade anatase.

Figure 2A:
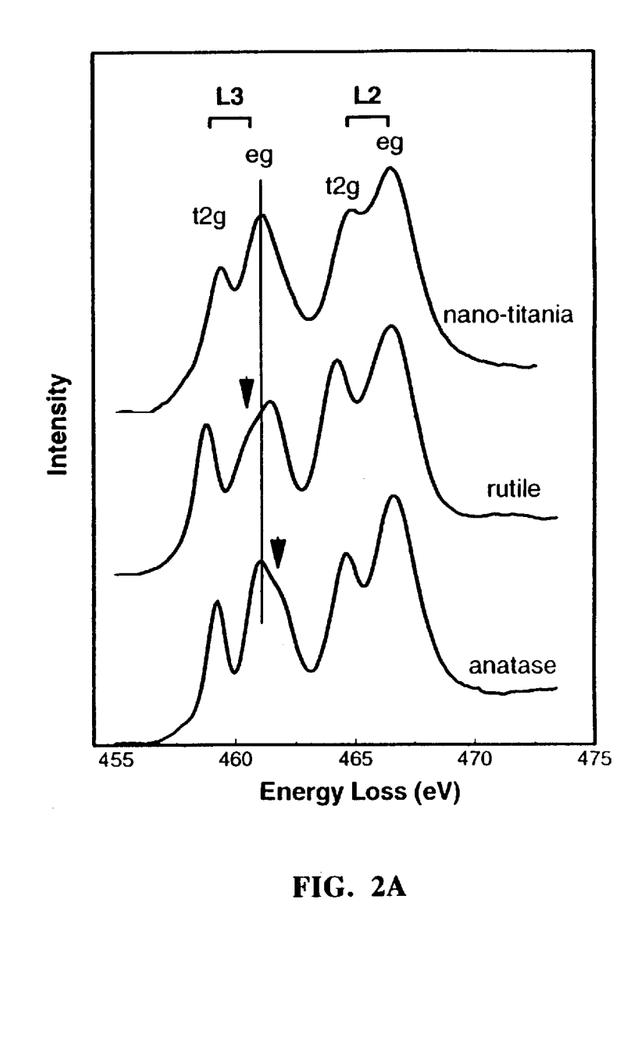
Figure 2B:
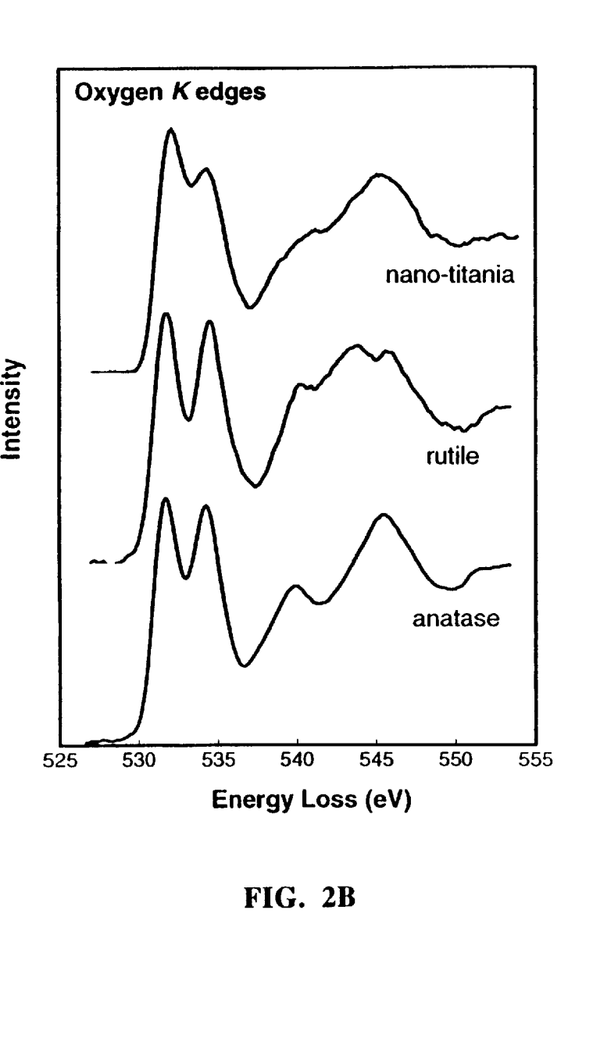

Electron energy-loss spectroscopy is a method for comparing subtle differences in bonding and electronic properties of solids which are directly relevant to their catalytic properties. FIG. 2 shows experimental electron energy-loss spectroscopy spectra for the L2,3 edge of octahedrally coordinated $Ti^{4+}$, in anatase, rutile, and nano-titania. The L3 and L2 edges result from the promotion of Ti 2p electrons to empty 3d states. The separation of the L2 and L3 edges by about 5.4 eV results from spin-orbit splitting. The spin orbit splitting arises because of the coupling of the spin quantum number (either +½ or −½) with the angular momentum (1) resulting in a total quantum number $j=1±½$. For Ti, the angular momentum is 1, which allows 2p electrons with quantum numbers of ³⁄₂ and ½. The $2p^{3/2}$ electrons define the edge onset because they have a lower binding energy than the $2p^{1/2}$ electrons. In the spectra, both the L2 and L3 edges are further split into two distinct peaks separated by about 2.5 eV because of crystal field effects. The lower energy peak of the L3 edge is related to the t2g energy level (from the 3-fold degenerate dxy, dyz, and dxz orbitals) while the higher energy peak involves the eg energy levels (from the 2-fold degenerate $dx^2-y^2$, and $dz^2$ orbitals). The eg part of the Ti L edge is known to be sensitive to distortions in the Ti bonding environment. In anatase and rutile, the bonding environments are distorted from perfect octahedral coordination because of the influence of adjacent Ti polyhedra. These distortions result in additional splitting of the eg peaks in the Ti L edge (these additional peaks are indicated with arrows in the spectra in FIG. 2a). Because of the small grain size, the distorted sites at the particle surfaces cause significant broadening of the peaks in the Ti L2,3 edge for nano-titania relative to the coarser grained rutile and anatase. FIG. 2 demonstrates that the electronic and atomic bonding environments of titanium and oxygen in nano-titania are different from those in anatase and rutile. Although not wanting to be bound by the following statement, it is likely that these properties coupled with the approximately 50 fold greater surface area and the large band gap of approximately 3.3 eV make nano-titania a more effective catalyst for degradation of PAHs when combined with ozone and other reagents including but not limited to peroxide and metallic Fe.

Nano-titania has been shown to be more effective than anatase for photocatalytic ultraviolet destruction of organics in aqueous solutions (Fotou et al., 5th World Congress of Chemical Engineering, Vol. 4: 620–625, 1996), but it has not been used previously in conjunction with ozone. Nano-titania and metallic iron have not been used in combination with ozone for catalytic degradation of organics. The redox potentials of most of the short lived radical species produced by these catalysts when combined with ozone are very high (greater than −1.8 V), and, therefore, are highly reactive towards PAHs.

The present invention provides an efficient, economical and rapid method to remediate material contaminated with PAHs, with minimal release of undesirable gases into the atmosphere. The method of the present invention provides an efficient alternative to incineration of contaminated material. This method provides PAH breakdown products that are either non-toxic or can be readily rendered non-toxic, and in one embodiment produces the products $CO_2$ and $H_2O$. The present method also permits treatment of liquids, such as aqueous solutions and suspensions, and organic solutions and suspensions contaminated with PAHs. The present method also permits treatment of soil, silt, permafrost, and sludge, as well as treatment of dry soils that are contaminated with PAHs. The method of the present invention is ideally suited for large scale and continuous remediation of contaminated material.

More particularly, the present invention broadly relates to a method for remediating material contaminated with PAHs comprising, combining material contaminated with PAHs that is less than approximately one-half inch in particle size with water, catalyst, including but not limited to metallic iron and nano-titania, a first oxidant other than ozone and at least one surfactant to form a mixture; mixing these reagents and the contaminated material; and adding ozone gas to the mixture to further oxidize the PAH contaminants.

Figure 1:
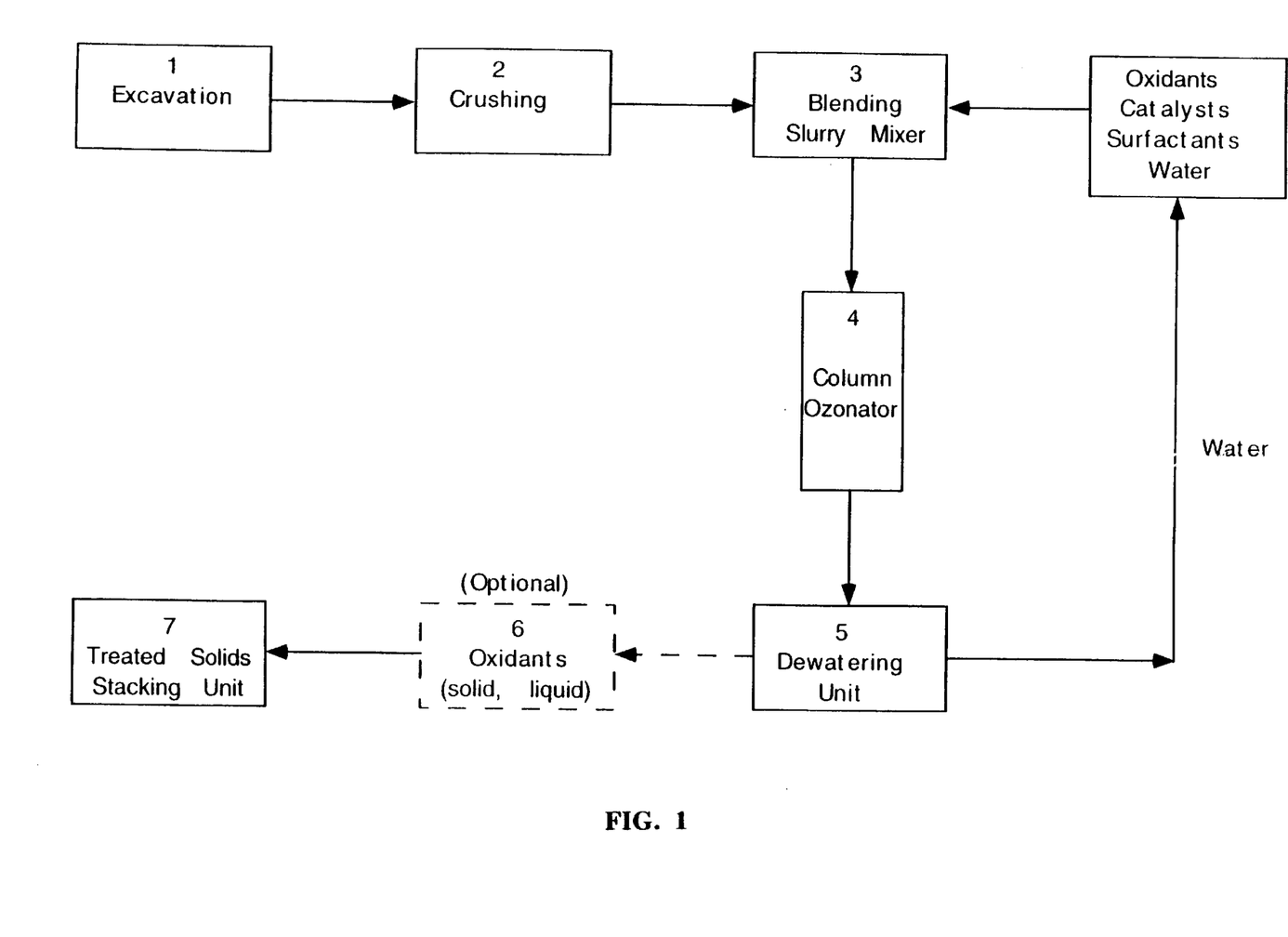
FIG. 1 is a flow diagram of one embodiment of the method of the present invention involving multistage catalytic oxidation of material contaminated with PAHs.

The method of the present invention for use with contaminated material which requires grinding to achieve a particle size of less than about one-half inch is generally illustrated in FIG. 1.

The surface area between contaminated materials to be treated, such as soil, silt, permafrost, sand, aggregate, and combinations thereof, and the catalysts and oxidants is substantially increased to optimize contact between the contaminants and catalyst, thereby maximizing the degree and rate of oxidation and facilitating rapid processing of large quantities of contaminated materials. The surface area is maximized using a combination of physical size reduction of the contaminated material, agitation (through grinding, crushing, and/or ultrasonication), and surfactants to effect maximum transfer of the organics to the aqueous phase. The method of the present invention desirably is combined with other processes, such as pre-sorting to remove uncontaminated material, blending, e.g., combining soft tars and fines, and collecting and separating oil and water mixtures, prior to the catalytic oxidation method of the present invention. The method of the present invention desirably is also combined with further processing steps after the catalytic oxidation, such as de-watering the oxidized mixture, recycling the water back into the remediation process, testing and/or transporting the non-hazardous product of the oxidation to a landfill site.

PAH-contaminated material, such as sand, soil, silt, sludge and aggregate is blended and crushed to a diameter of about one-half inch or less, desirably about one-eighth inch or less. For example, soft tars may be blended with fines, rock, concrete, or brick and may be crushed, for example to about one inch prior to further crushing to less than about one-half inch, preferably less than approximately one-eighth inch. This blending and physical size reduction step increases the surface area of the contaminated material available for directly contacting water, surfactants, catalysts, and oxidants in subsequent steps. It is important that the material be reduced to this size in order to achieve efficient oxidation and provide rapid processing of the material. Water and one or more surfactants are then added and blended into the crushed material to form an aqueous mixture. It should be noted that while water and surfactants could be added prior to or during the crushing step, as a practical matter these components are desirably added after the size of the material has been reduced by crushing and blending. It has been empirically determined that bi-terpene surfactants (e.g., bi-terpene available from Biochem Systems, Atlanta, Ga.) are desirable. Other classes of surfactants which facilitate transfer of PAHs to the aqueous phase (e.g. degreasers), which are effective against PAHs and other low-solubility organics may also be used in an amount in the range of 10 to 100 parts by weight per 1000 parts by weight of contaminated material. The bi-terpene surfactant desirably is provided in an amount in the range of 10 to 100 parts by weight per 1000 parts by weight of contaminated material. More desirably the bi-terpene surfactant is provided in an amount of approximately 25 parts by weight per 1000 parts by weight of contaminated material. The water is generally provided in an amount up to 500 parts by weight per 1000 parts by weight of contaminated material. It is important to note that the amounts of surfactant and water added depend on the nature of the contaminated material being treated, the transfer efficiency of the surfactant, and what is required to form an aqueous mixture for optimum interaction with ozone. High pressure washing of contaminated material may also be used in conjunction with the method of the present invention and may be optionally combined with surfactants.

It is also desirable to use an efficient and fast blending apparatus capable of handling large volumes and tonnage of contaminated material in order to rapidly and continuously process contaminated material. One or more first oxidants, other than ozone, are added, desirably with mixing and agitation (e.g., ultrasonication, or mechanical agitation, such as pumping the mixture through high pressure jets, vortexing or mixing with blades) to facilitate rapid contacting of the oxidant with the surfaces of the contaminated material. A desirable first oxidant is hydrogen peroxide, which has a redox potential of −1.736 volts (V). Other oxidants, such as perchlorate ($ClO_4$, −1.7 V), permanganate ($MnO_4$, −1.507 V) and persulfate ($S_2O_8^{2-}$, −2.01 V), may be used. The first oxidant is added to the mixture in a ratio of 10 to 50 parts by weight per 1000 parts by weight of contaminated material.

Catalysts, for example, finely divided metals such as metallic iron (desirably less than 120 mesh), and a metal oxide, such as nano-titania, are added to catalyze this initial oxidation reaction. This oxidation step serves to oxidize the easily oxidizable hydrocarbons, thereby minimizing the amount of ozone required and the contact time required to further oxidize the contaminated material in the subsequent ozonation step. It is to be understood that the contact time with ozone depends on the nature of the contaminated material, on the ozone input rate, and on the efficiency of mixing with the contaminated mixture.

Application of heat and/or pressure may be optionally used in the practice of the present invention in order to accelerate the reaction. Heat may be applied to the mixture, to the reactants and to the mixing chamber or reaction column. Heat may be applied at temperatures up to 100° C.

The metals and metal oxides used as catalysts in the practice of the present invention may be any metal, metal alloy, or metal oxide that can remain unoxidized or achieve a transition to a higher oxidation state(s). Metals include, but are not limited to, iron, silver, copper, cobalt, gold, manganese, nickel, stainless steel, steel wool, and composites and combinations thereof. Iron is a preferred metal and nano-titania is a preferred metal oxide of the present invention. The metal and metal oxides can be added to the mixture as powders and it is important that they be finely divided, or used in a manner that provides high surface area. Ideally the metals and metal oxides remain suspended in the mixture. Such finely divided powders include, but are not limited to, granules, flakes, platelets, spheres, steel or ceramic wools, wires, fine filaments, threads, and high porosity agglomerates, all of which provide high surface area per unit weight to facilitate the reaction. In different embodiments the granules may be less than a millimeter, or less than a micron in size. The catalyst powders may be optionally recovered after ozonation and reused.

High porosity metals are desirable due to the available surface area. An additional benefit of the use of finely divided metallic iron is that it is inexpensive, thereby contributing to the overall economy of the method. It is believed that finely divided metallic iron ($Fe^{0+}$) rapidly oxidizes to $Fe^{2+}$ and then to $Fe^{3+}$. This $Fe^O$ to $Fe^{n+}$ transition(s) catalyzes the decomposition of ozone to free radicals. $Fe^O$ and other ground state metals and alloys catalyze the decomposition of ozone to free radicals.

Metal and metal oxide coated stationary fixtures, moving fixtures such as rotating fixtures, and other surfaces within the reaction vessel(s) may function as catalysts. These fixtures and surfaces include, but are not limited to, impellors, baffles, vanes, paddles, meshes, grids, gratings, beds, deflectors and reaction vessel walls.

In one embodiment, metallic iron is provided in an amount in the range of approximately 2 to 100 parts by weight per 1000 parts by weight of contaminated material. Desirably, metallic iron is provided in an amount in the range of approximately 5 to 50 parts by weight per 1000 parts by weight of contaminated material. More desirably, the metallic iron is provided in an amount of approximately 20 parts by weight per 1000 parts by weight of contaminated material.

The nano-titania is provided in an amount in the range of 2 to 100 parts by weight per 1000 parts by weight of contaminated material. Desirably, the nano-titania is provided in an amount in the range of 2 to 50 parts by weight per 1000 parts by weight of contaminated material. More desirably, the nano-titania is provided in an amount of approximately 5 parts by weight per 1000 parts by weight of contaminated material.

The reaction may be conducted at different pH levels. Since ozone is maximally efficient at alkaline pHs, it may be useful to add a base to adjust the pH of the mixture, especially with contaminated materials, such as slurries or liquids, that provide acidic mixtures, to achieve a pH above pH 7, preferably between pH 8 and pH 11, and most preferably about pH 9. A preferred base is sodium hydroxide, although other bases may be employed. Bases may be added in solid or liquid form depending on the acidity of the contaminated material, and may be added in amounts sufficient to adjust the pH to the desired alkalinity.

The mixture is then contacted with ozone gas, preferably in an amount in the range of approximately 0.001 to 3 parts by weight of ozone to 1 part by weight of PAHs in the contaminated material. Preferably, approximately 0.05 to 2 parts by weight of ozone gas is added to 1 part by weight of PAHs in the contaminated material. More preferably, approximately 0.1 to 1.5 parts by weight of ozone gas is added to 1 part by weight of PAHs in the contaminated material. Most preferably about 1 part by weight of ozone gas is added to 1 part by weight of PAHs in the contaminated material. Ozone is bubbled through mixtures of contaminated liquids or slurries of solids. Smaller ozone bubbles increase the surface area available for reaction, thereby decreasing the cost of the ozone and the cost of remediating the PAHs in the contaminated material. Ozone bubbles in a range of diameters of 0.1 $\mu$m to 1 mm are used, preferably 0.5 $\mu$m to 0.5 mm, and most preferably 0.75 $\mu$m to 0.05 mm.

The contact time between ozone and mixture depends on the initial concentration of PAHs in the mixture, viscosity and other physical properties of the mixture, ozone injection capacity, and ambient ozone concentration within the reaction chamber. Additional amounts of catalyst, including but not limited to metallic iron or nano-titania, or both, may be added to the mixture during the ozone oxidation.

Desirably the mixture and ozone are contacted in any mixing apparatus that provides rapid mixing to increase the rate of reaction and to minimize the time required to oxidize the PAHs to environmentally acceptable levels, for example those levels prescribed by the EPA. Heat and/or pressure may be optionally applied to the mixing apparatus to accelerate the reaction rate. For contaminated aqueous and organic solutions and suspensions, beakers or large containers may be used as a mixing container with stirring or another form of fluid or air agitation. Jets and jet sprays of pressurized liquid, mixture, air, oxygen, ozone, or ozone and mixture, constitute one form of mixing that may be employed with mixtures or particulates or liquids in mixing chambers or in a column. Ultrasonication is another method of mixing which may be employed in the practice of the present invention. Ozone may be bubbled through these mixtures containing the additional reagents used in the method of the present invention. In another embodiment, treatment of mixtures of contaminated materials such as soil, sludge, aggregate, or slurry may be achieved in an effective mixing apparatus suitable for rapid catalytic oxidation and continuous processing of the contaminated materials. One such embodiment is a column mixer wherein the mixture is pumped into the top of the mixing column and flows downward to exit the mixing column. Simultaneously, ozone gas is bubbled into the bottom of the mixing column or at various levels in the mixing column, and travels up the column in a counter current fashion to the flow of the mixture. Alternatively, the ozone gas may be introduced through the sides of the column Desirably the mixing column further comprises high velocity impellor blades and baffles, such as fixed metal baffles or fixed nano-titania ceramic baffles, along the length of the mixing column to keep the mixture levitated and to continuously regenerate ozone bubbles. Jets and jet sprays of pressurized liquid or air may be directed to baffles and impellor blades in the column. It is to be understood that ultrasonication may be applied within the column for additional mixing. Additional amounts of catalysts, including but not limited to metal and nano-titania, or both, are optionally added in conjunction with introduction of the ozone gas.

The metals, such as metallic iron, and the metal oxide, nano-titania, which act as catalysts have been found to be surprisingly and unexpectedly effective for oxidizing PAHs, particularly when used in conjunction with surfactants and oxidants, such as hydrogen peroxide, and ozone. Without these catalysts, the amount of total ozone required and the contact time required to oxidize the PAHs to acceptable levels would prohibit continuous processing of massive amounts of material, such as the material in a contaminated landfill site. The cost of practicing the method of the present invention may be reduced through recovery and reuse of catalysts.

When the first oxidant is a peroxide, such as 50% hydrogen peroxide, it is desirable to provide it in the range of 10 to 50 parts by weight per 1000 parts by weight of contaminated material. Most desirably the hydrogen peroxide is provided in an amount of approximately 25 parts by weight per 1000 parts by weight of contaminated material. Other oxidants may be used in the range of 10 to 50 parts by weight per 1000 parts by weight of contaminated material.

A desirable embodiment of the present invention is a method for remediating material contaminated with PAHs comprising the following steps: combining material contaminated with PAHs that is less than approximately one-eighth inch in particle size with sufficient surfactant and water to make a mixture, and approximately 20 parts by weight of metallic iron, approximately 5 parts by weight of nano-titania, and approximately 25 parts by weight of a 50% hydrogen peroxide solution for every 1000 g of contaminated material; mixing the mixture; adjusting the pH of the mixture to an alkaline pH, adding approximately 20 parts by weight of metallic iron, approximately 5 parts by weight of nano-titania, and approximately 1 part by weight of ozone gas to the mixture with mixing sufficient to generate submicron sized ozone gas bubbles, to further oxidize the PAH contaminants. The viscosity of the mixture is optimized for interaction of ozone, oxidant and catalysts with the contaminated material.

In a desirable embodiment, the method of the present invention for remediating PAH contaminated material comprises the following steps: A) combining material contaminated with PAHs in liquid form or having an average particle size of less than approximately one-eighth inch in diameter with the reagents described in step B; B) adding between 0 and 500 parts by weight of water per 1000 parts by weight of PAH-contaminated material (amount added depends on the moisture content of the contaminated material and the amount of water needed to make a mixture of optimal viscosity), between 2 and 100 parts by weight of metallic iron powder, between 2 and 100 parts by weight of nano-titania, between 10 and 50 parts by weight of 50% hydrogen peroxide or a similar concentration range of another non-ozone oxidant, taking into account different redox potentials, and between 10 and 100 parts by weight of surfactant for every 1000 parts by weight of contaminated material to form a mixture; C) mixing the mixture, optionally adjusting the pH of the mixture to approximately pH 7 or greater if necessary, adding between 5 and 50 parts by weight of metallic iron and between 2 and 50 parts by weight of nano-titania, and adding approximately 0.001 to 3.0 parts by weight of ozone gas per 1 part by weight of PAHs in the dispersion or mixture with sufficient mixing to generate submicron sized ozone gas bubbles and to further oxidize the PAH contaminants. Additional amounts of catalysts, including but not limited to metallic iron or nano-titania, or both, are optionally added to the mixture during the ozone oxidation.

This invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Ozone Treatment of an Aqueous Suspension of Contaminated Material Obtained from a Former Coke Processing Plant Materials from three PAH-contaminated waste streams (coal/coke fines, tar-contaminated soil, and mixed tars) were blended and crushed to less than one-eighth inch in particle size. Total PAHs in the blended material were 1.3% (13,000 ppm or greater) by weight. Since the total PAHs were measured using EPA Method 8270, 1.3% is considered a lower limit.

The blended material was mixed with bi-terpene surfactant (a natural product derived from pine trees available from Biochem Systems, Atlanta, Ga.), and water to form a mixture. Aqueous hydrogen peroxide (50% solution), metallic iron and nano-titania were added to the mixture. The amounts of added reagents are shown in Table 1. With vigorous agitation and mixing, catalyzed hydrogen peroxide oxidation proceeded for 5 minutes. Next, the mixture was transferred to a cylindrical ozonation column with internal high-speed mixing impellers spaced equally along the length of the column. The mixture was added at the top of the column. Ozone gas was introduced at the base of the column and bubbled up through the mixture. The mixture was continuously recirculated through the column until a total of 234 gm of ozone was added (Table 2).

TABLE 1

| Reagents | Amount (gm) |
| --- | --- |
| Contaminated blended material | 13000 |
| Water | 1625 |
| Bi-terpene surfactant | 325 |
| Hydrogen peroxide | 325 |
| Nano-titania | 125 |
| Metallic Fe | 500 |
| PAHs | >174 |

After introduction of successive 26 gm quantities of ozone, mixture samples were recovered from the base of the column, passed through a 0.0383 inches (# 18 screen) mesh, and collected. Approximately 93% by weight of the solids passed through the mesh. The remaining approximately 7% was in the form of solid particles more than 0.0383 inches in diameter.

The PAH content of the samples was analyzed using microprobe two-step laser desorption mass spectroscopy ($mL^2MS$). This technique is ideally suited for the analysis of complex mixtures of organics like tarry blends for the following reasons; (1) it is rapid and quantitative in allowing relative comparison of PAH concentrations between samples to an accuracy of ±5%, (2) it is capable of analyzing all PAHs simultaneously within a sample by virtue of the time-of-flight mass spectrometric detection scheme used; (3) it can thermally desorb PAHs from solid matrices (without molecular fragmentation) even when they cannot be removed with aggressive solvent extraction. This third attribute of $mL^2MS$ was particularly important because analyses of the blended material using the standard EPA methods yielded highly variable results. The $mL^2MS$ instrument is described in detail by Kovalenko et al., *Anal. Chem.*, 64: 682–690 (1992) and Hrubowchak et al., *Anal. Chem.*, 63: 225–232 (1991).

PAH concentrations in the mixture samples and the coarse-grained (>0.0383 inches) solids were measured using the $mL^2MS$ technique. Nine mixture samples were analyzed for PAHs after addition of 0, 26, 52, 78, 104, 130, 156, 182 and 234 gm of ozone. To quantify relative PAH concentrations in these aqueous solutions, a 0.2 ml aliquot of each was transferred to a 1.5 ml microcentrifuge tube using a disposable, sterilized 1 ml hypodermic syringe. A new syringe was used for each solution to prevent cross-contamination between samples. The centrifuge tubes were then each topped up with 0.8 ml of spectroscopic grade methylene chloride. Since methylene chloride is essentially insoluble in water, a phase extraction was performed by vortex mixing for 2 min and ultrasonication for 25 min of the centrifuge tubes. This allowed any PAH species in the aqueous phase to be extracted into the methylene chloride, after which each tube was centrifuged for 1 min at 3,000 rpm to facilitate separation of the aqueous and organic phases. Methylene chloride formed the top fraction, from which a 25 µl aliquot was removed with a micropipette and deposited onto a 3×3 mm square pad of 0.25 mm cellulose nitrate filter paper. The methylene chloride was evaporated in a fume hood over a period of several minutes at ambient temperature. Each dry cellulose nitrate pad was then mounted onto a sample mount with double sided sticky tape, and introduced into the $mL^2MS$ instrument. A 250-shot moving average was obtained for each sample with background subtraction and the total PAH yield integrated over the mass range of 105 amu to 450 amu. This mass range accounted for more than 99.9% of the signal intensity from all the spectra acquired. All samples were run in sequence within the same day, starting with the sample that had received the longest ozone treatment and proceeding to the untreated sample. This analysis sequence reduced the time needed to allow the chamber background to fall to acceptable levels between samples. An acceptable level was defined as less than about 1% of the total integrated signal from any of the samples.

The coarse-grained (>0.0383 inches) solid samples were also analyzed for PAH concentrations. To quantify the relative PAH concentrations in these solids, approximately 1 gm of each was crushed to a fine powder in a mortar and pestle. The average particle size after crushing was estimated to be in the order of 100 µm–200 µm. Larger particulates that could not be broken up, such as large quartz grains, were removed by hand during the crushing. Samples that were still wet from the treatment procedure were allowed to dry overnight in a cold airflow in a fume hood before proceeding. From each of the crushed soils, 200 mg of material was transferred to a 1.5 ml microcentrifuge tube using a chrome-nickel spatula. To each centrifuge tube was then added 1 ml of spectroscopic grade methylene chloride and the contents agitated by alternate vortex mixing 7 times 1 min each and ultrasonication 7 times 1 min each. After 15 min the twelve samples were centrifuged for 1 min at 3,000 rpm and allowed to settle overnight. The procedure described above for use in the mixture samples was followed, with a 25 µl aliquot of methylene chloride solution being removed from each centrifuge tube with a micropipette and deposited onto a 3×3 mm square pad of 0.25 mm cellulose nitrate filter paper. The methylene chloride was evaporated from the filter paper in a fume hood over several minutes at ambient temperature. Each cellulose nitrate pad was mounted onto a sample mount with double sided sticky tape, and introduced into the mL$^2$MS instrument. A 250-shot moving average was obtained for each sample with background subtraction and the total PAH yield integrated over the mass range of 105 amu to 450 amu. The scheme was repeated 3 separate times over the course of several weeks with each run being completed within a day. The results of these three runs were then averaged. As with the aqueous samples, the most contaminated samples in a sequential run were analyzed last.

Figure 3:
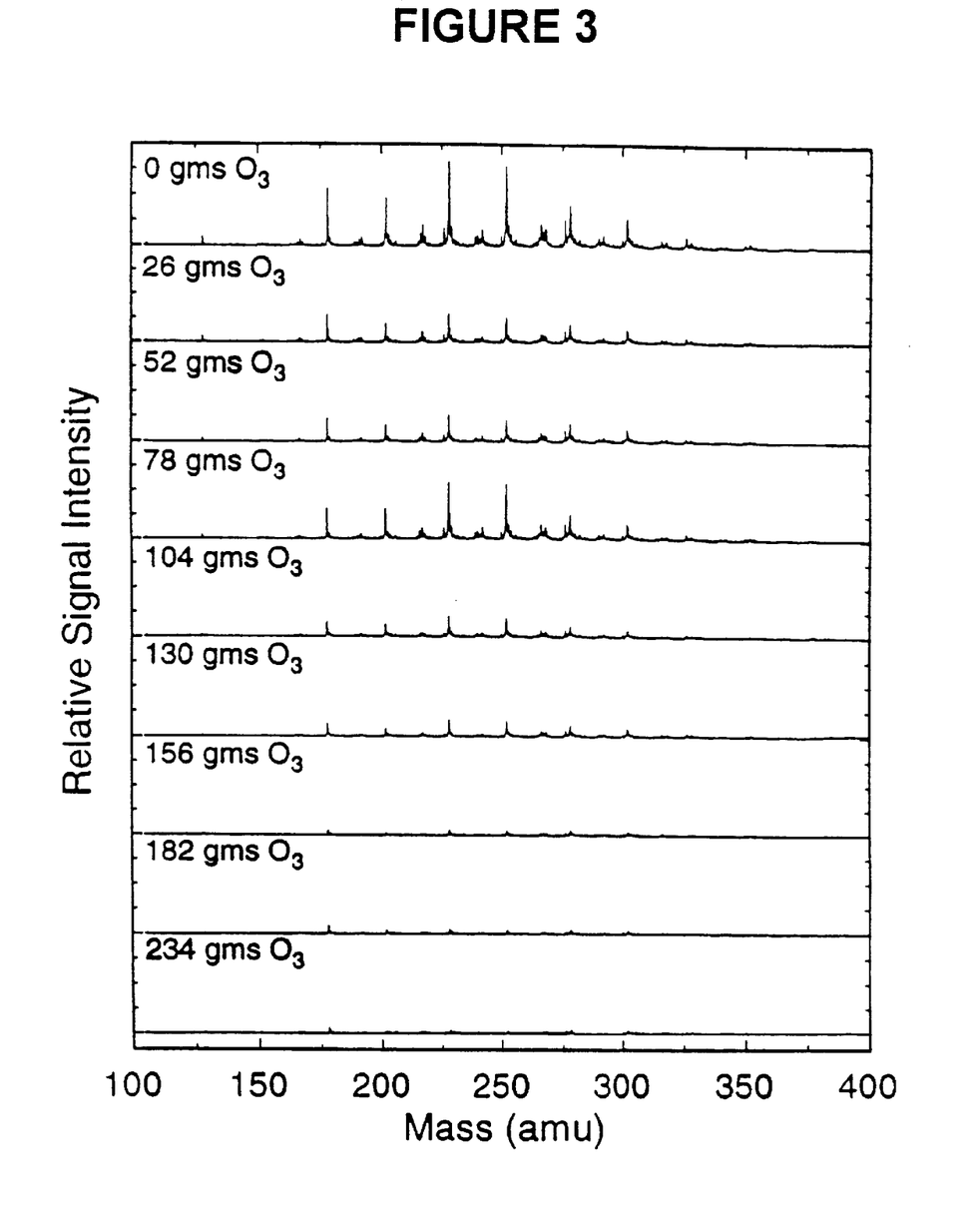
FIG. 3 shows mass spectra of the blended material after addition of 0, 26, 54, 78, 104, 130, 156, 182, and 234 gm of ozone. This figure demonstrates reduction of individual PAH concentrations with addition of increasing amounts of ozone in the present method.
Figure 4:
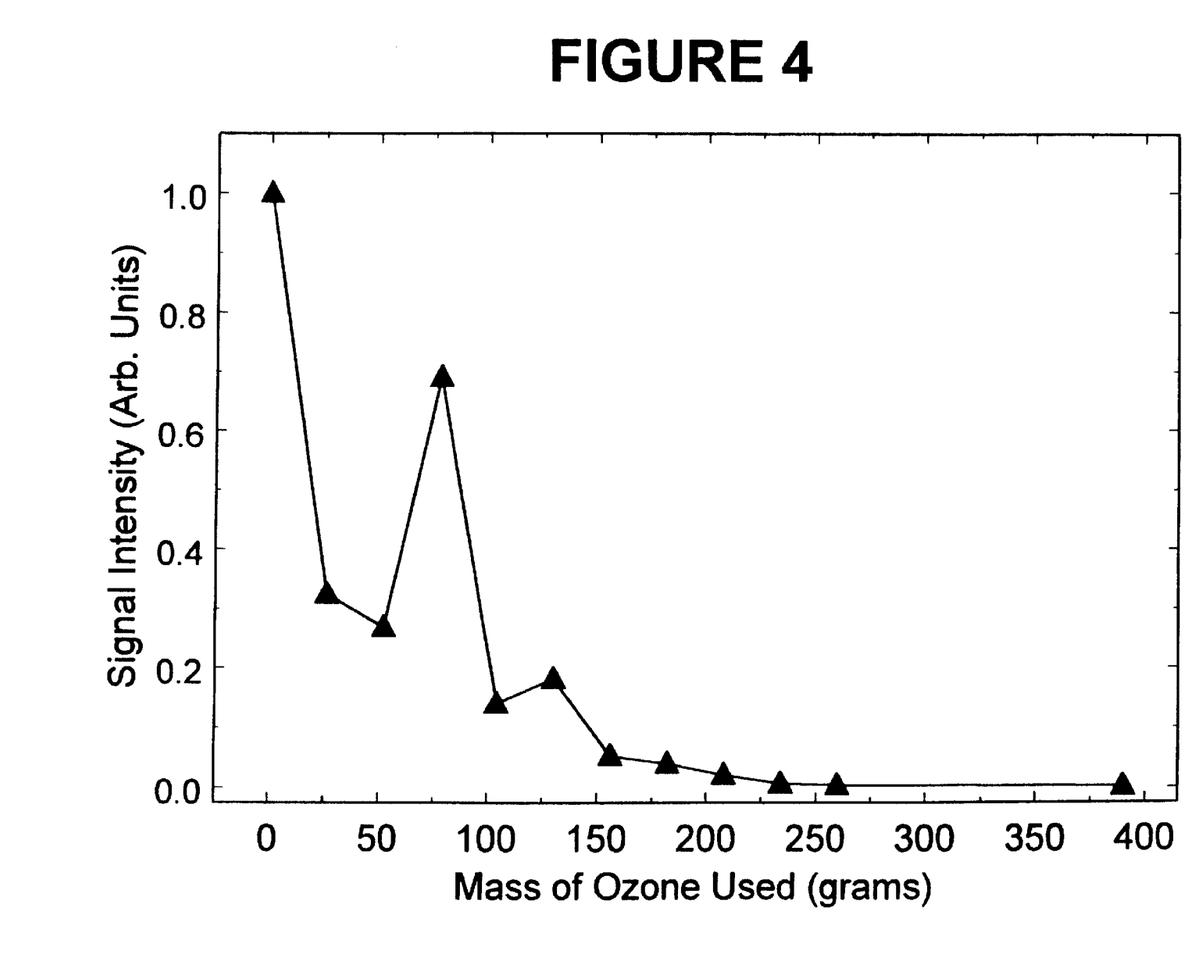
FIG. 4 shows reduction in total PAHs as a function of the amount of ozone added.
Figure 5A:
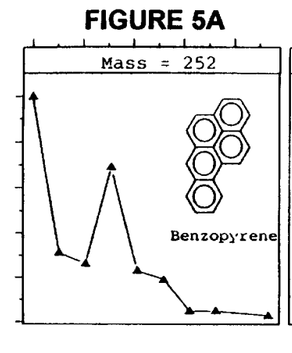
FIG. 5 shows the degradation of individual parent PAHs (3–6 membered rings): phenanthrene (mass 178), pyrene (mass 202), chrysene (mass 228), benzo(a)pyrene (mass 252), dibenzo(a,h)anthracene (mass 278), and dibenzopyrene (mass 302) as a function of the amount of ozone added.
Figure 5B:
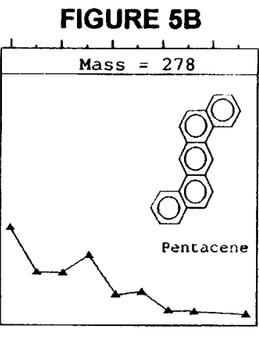
Figure 5C:
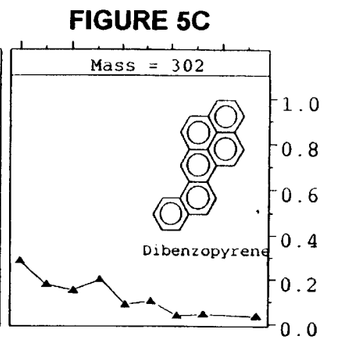
Figure 5D:
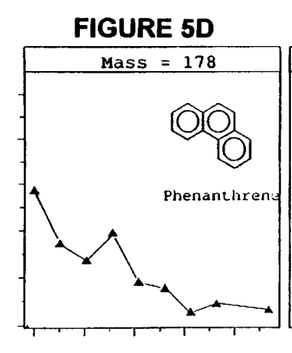
Figure 5E:
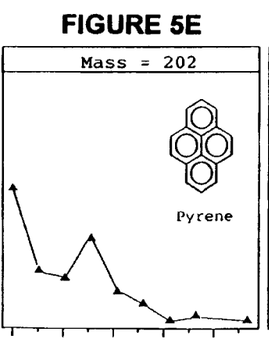
Figure 5F:
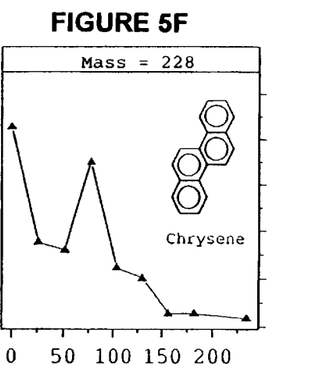

The combined results of the mL$^2$MS analysis of the mixture and (>0.0383 inch diameter) solids are presented in FIGS. 3 and 4 and Table 2. The measured total integrated PAH contributions were compared relative to the untreated material whose PAH concentration was taken as unity. The effect of ozone addition in the method of the present invention on the PAH concentration of the blended material was dramatic. Addition of approximately 1 part by weight ozone per 1 part by weight of PAHs was sufficient to reduce PAHs by about 95% assuming the initial PAH concentration was only 1.3%. Addition of approximately 1.3 parts by weight of ozone per 1 part by weight of PAHs reduced PAHs by more than 99%.

TABLE 2

Summary of Measured PAH Concentrations after Soil Treatment with Ozone.

| Ozone (gm) | Total PAH signal | Reduction in PAH signal % |
|---|---|---|
| 0 | 1.000* | 0 |
| 26 | 0.324 | 68 |
| 52 | 0.269 | 73 |
| 78 | 0.691 | 31 |
| 104 | 0.140 | 86 |
| 130 | 0.182 | 82 |
| 156 | 0.053 | 95 |
| 182 | 0.040 | 96 |
| 234 | 0.007 | >99 |

*(>174 gm PAHs)

It is to be understood that the exact quantity of ozone necessary to effect a given reduction of PAH concentration will depend specifically on mechanical factors, such as the ability to allow suitable interaction time for the ozone with the PAHs, and on the specific species of PAHs within a given contaminated soil sample.

Since the mL$^2$MS technique is specific to PAHs under the conditions used for this study, it was not possible to determine the breakdown products of the ozonolysis. From the chemistry of ozone it is likely there are many intermediate aromatic aldehydes, ketones and esters (Bayer-Villinger oxidation) produced. That these aromatic breakdown products are not observed suggests the reaction rates for subsequent ozonolysis of these intermediates is considerably greater than the starting material.

EXAMPLE 2
Remediation of PAHs in a Contaminated Site

The method of the present invention is used to remediate a site which contains thousands of tons of contaminated soil, sludge, and water contaminated with PAHs. The soil is comprised of earth, ash, sand, and pieces of concrete. Bulldozers collect contaminated soil and sludge and transport it to a conveyor which feeds the contaminated material to a crushing apparatus. The crushing apparatus reduces the particle diameter to less than one-half inch. These particles are fed into a mixing chamber where they are blended with surfactant and water to form a mixture. Next, catalyst and a first oxidant are added to and mixed with the mixture. The relative amounts of reagents are added in quantities presented in Table 3. The mixture is transferred to a cylindrical ozonation column with internal high-speed mixing impellors spaced equally along the length of the column. The mixture is added at the top of the column and ozone gas is introduced at the base of the column and bubbled up through the mixture.

Analysis of the PAH content of samples of the mixture obtained from the bottom of the column reveals a reduction of more than 95% of the PAHs, compared to the PAH content of the untreated material.

Contaminated water in a pond located in the site is pumped into tank trucks and transported to the PAH remediation station. Alternatively, the contaminated water is pumped directly to the PAH remediation station. Analysis of the water reveals a pH of 1. The contaminated water is mixed with a first oxidant, catalyst and base. The amounts of added reagents are presented in Table 3. Addition of the base increases the pH to a value of 7 or greater. The mixture is transferred to a cylindrical ozonation column with internal high-speed mixing impellors spaced equally along the length of the column. The mixture is added at the top of the column and ozone gas is introduced at the base of the column and bubbled up through the mixture.

Analysis of the PAH content of samples of the mixture obtained from the bottom of the column reveals a reduction of more than 95% of the PAHs, compared to the PAH content of the untreated contaminated water.

TABLE 3

| Sample | Water | Surfactant | First Oxidant | Catalyst | Base | Ozone* |
|---|---|---|---|---|---|---|
| Soil | 50 | 20 | 10 | 2 | 0 | 0.001 |
| Soil | 100 | 10 | 50 | 20 | 0 | 2.0 |
| Soil | 250 | 50 | 25 | 50 | 0 | 0.05 |
| Soil | 500 | 100 | 40 | 100 | 0 | 3.0 |
| Water (pH 1) | 0 | 0 | 25 | 2 | N | 1.5 |
| Water | 10 | 20 | 10 | 50 | 0 | 0.1 |
| Water | 500 | 10 | 50 | 50 | 0 | 2.0 |

Samples (soil and water) provided in 1000 parts by weight. All reagents expressed as parts by weight of sample of contaminated material with the exception of ozone. *Ozone is provided in parts by weight of PAHs in contaminated material. N is the amount of base required to adjust the pH to 7 or greater.

EXAMPLE 3
Remediation of PAHs in a Contaminated Site

The method as described in Example 2 is applied to contaminated water and soil, and in addition, catalysts are added to the ozonation column during exposure of the contaminated soil and water to ozone.

Analysis of the PAH content of samples of the mixture obtained from the bottom of the column reveals a reduction of more than 95% of the PAHs, compared to the PAH content of the untreated contaminated water and soil.

EXAMPLE 4
Remediation of PAHs in Contaminated Silt

The method as described in Example 2 is applied to contaminated silt obtained from dredging a river contaminated with PAHs from a refinery. The silt grains are less than or equal to 100 μm in size. Crushing is not necessary before application of the method as described in Example 2.

Analysis of the PAH content of samples of the mixture obtained from the bottom of the column reveals a reduction of more than 95% of the PAHs, compared to the PAH content of the untreated contaminated silt.

EXAMPLE 5
Remediation of PAHs in Contaminated Sand Obtained from Berns Surrounding Petrochemical Storage Facilities and from Desert Sands Near a Refinery The method as described in Example 2 is applied to contaminated sand obtained from a bern contaminated with PAHs from a ruptured petrochemical storage tank, and to desert sand obtained from the vicinity of a refinery. The sand grains are non-porous and non-absorptive, and are coated with material containing the PAHs. Since the sand grains are less than one-eighth inch in particle size, crushing is not necessary before application of the method as described in Example 2.

Analysis of the PAH content of samples of the mixture obtained from the bottom of the column reveals a reduction of more than 95% of the PAHs compared to the PAH content of the untreated contaminated sands.

EXAMPLE 6
Remediation of PAHs in Contaminated Permafrost Surrounding Petrochemical Storage Facilities and from Permafrost Near a Refinery in the Arctic The method as described in Example 2 is applied to PAH-contaminated permafrost surrounding a ruptured petrochemical storage tank in the arctic, and to permafrost obtained from the vicinity of a refinery in the arctic. The permafrost is ground to a particle size less than one-half inch before application of the method as described in Example 2.

Analysis of the PAH content of samples of the mixture obtained from the bottom of the column reveals a reduction of more than 95% of the PAHs compared to the PAH content of the untreated contaminated permafrost.

EXAMPLE 7
Remediation of PAHs in a Contaminated Mesoporous Material, Vermiculite) Used in a Gas Station to Absorb Liquids Contaminated with PAHs The method as described in Example 2 is applied to contaminated vermiculite used in a gas station to absorb spilled liquids, contaminated with PAHs. The vermiculite is highly porous and absorptive and crushing is not necessary before application of the method as described in Example 2.

Analysis of the PAH content of samples of the mixture obtained from the bottom of the column reveals a reduction of more than 95% of the PAHs compared to the PAH content of the untreated contaminated vermiculite.

EXAMPLE 8
Remediation of PAHs in Contaminated Soil Surrounding a Ruptured Subterranean Petrochemical Tank The method as described in Example 2 is applied to contaminated soil soaked with petrochemicals leaking from a subterranean petrochemical tank in the front yard of a residence. The soil is ground to a particle size less than one-eighth inch before application of the method as described in Example 2.

Analysis of the PAH content of samples of the mixture obtained from the bottom of the column reveals a reduction of more than 95% of the PAHs compared to the PAH content of the untreated contaminated soil.

It should be understood, of course, that the foregoing relates only to preferred embodiments of the present invention and that numerous modifications or alterations may be made therein without departing from the spirit and the scope of the invention. In particular one skilled in the art will understand that the amount and concentration of components used in the method of the present invention, as well as mixing parameters and reaction times may be varied depending on the particular type and concentration of PAH contamination, and upon the particular physical and chemical properties of the material to be treated.

I claim:

1. A method for remediating material contaminated with aromatic hydrocarbons, comprising:

combining material contaminated with aromatic hydrocarbons, catalyst, and a first oxidant other than ozone, to form a mixture, wherein said mixture includes as said catalyst at least about 2 parts by weight of metallic iron and at least about 2 parts by weight of nano-titania, and at least about 10 parts by weight of said first oxidant, per 1000 parts by weight of contaminated material;

mixing the mixture; and adding ozone gas to the mixture to oxidize and degrade said aromatic hydrocarbons.

2. The method of claim 1, wherein the mixture containing the ozone gas is mixed so as to create submicron sized ozone bubbles.

3. The method of claim 1, further comprising the addition of catalyst during addition of the ozone gas to the mixture.

4. The method of claim 1, further comprising adjusting the mixture during mixing through addition of base to achieve an alkaline pH.

5. The method of claim 1, wherein the contaminated material is processed in a continuous manner.

6. The method of claim 1, wherein the first oxidant is selected from the group of hydrogen peroxide, perchlorate, permanganate, and persulfate.

7. The method of claim 1, wherein the first oxidant is hydrogen peroxide.

8. The method of claim 7, wherein the hydrogen peroxide is provided as a 50% solution in an amount of approximately 10 to 50 parts by weight per 1000 parts by weight of contaminated material.

9. The method of claim 7, wherein the hydrogen peroxide is provided as a 50% solution in an amount of approximately 25 parts by weight per 1000 parts by weight of contaminated material.

10. The method of claim 1, further comprising addition of surfactant to the mixture.

11. The method of claim 10, wherein the surfactant is selected from the group of bi-terpene, soaps, solvents, supercritical fluids, detergents, degreasers and releasing agents.

12. The method of claim 10, wherein the surfactant is bi-terpene and is provided in an amount of approximately 10 to 100 parts by weight per 1000 parts by weight of contaminated material.

13. The method of claim 12, wherein the bi-terpene surfactant is provided in an amount of approximately 25 parts by weight per 1000 parts by weight of contaminated material.

14. The method of claim 1, wherein the is metallic iron is provided in an amount of approximately 2 to 100 parts by weight per 1000 parts by weight of contaminated material.

15. The method of claim 1, wherein the metallic iron is provided in an amount of approximately 5 to 50 parts by weight per 1000 parts by weight of contaminated material.

16. The method of claim 1, wherein the nano-titania is provided in an amount of approximately 2 to 100 parts by weight per 1000 parts by weight of contaminated material.

17. The method of claim 1, wherein the nano-titania is provided in an amount of approximately 2 to 50 parts by weight per 1000 parts by weight of contaminated material.

18. The method of claim 1, further comprising addition of water to the mixture.

19. The method of claim 18, wherein the water is provided in an amount of approximately 0 to 500 parts by weight per 1000 parts by weight of contaminated material.

20. The method of claim 18, wherein the water is provided in an amount of approximately 250 parts by weight per 1000 parts by weight of contaminated material.

21. The method of claim 1, wherein the contaminated material is particulate and the particle size is not greater than approximately one-half of an inch, further comprising addition of water and a surfactant.

22. The method of claim 1, wherein the contaminated material is particulate and the particle size is not greater than approximately one-eighth of an inch, further comprising addition of water and a surfactant.

23. The method of claim 1, wherein the ozone gas is provided in an amount of approximately 0.001 to 3.0 parts by weight per 1 part by weight of aromatic hydrocarbons in the contaminated material.

24. The method of claim 1, wherein the ozone gas is provided in an amount of approximately 0.05 to 2.0 parts by weight per 1 part by weight of aromatic hydrocarbons in the contaminated material.

25. The method of claim 1, wherein the ozone gas is provided in an amount of approximately 0.1 to 1.5 parts by weight per 1 part by weight of aromatic hydrocarbons in the contaminated material.

26. The method of claim 1, wherein the contaminated material is selected from liquids, aqueous solutions, aqueous suspensions, organic solutions, organic suspensions, chemicals, solvents, paints, water, salt water, ice, snow, soil, sludge, silt, permafrost, sand, tar, tar sand, asphalt, clay, concrete, wood, ceramics, plastic, clothing, fabric, mesoporous media, vermiculite, and mixtures thereof.

27. The method of claim 1, wherein the catalyst is in the form of divided powders, steel wool, ceramic wools, wires, fine filaments, threads, high porosity agglomerates or combinations thereof.

28. The method of claim 1, wherein the contaminated material is particulate and the particle size is less than approximately 200 microns.

29. A method for remediating material contaminated with aromatic hydrocarbons, comprising:

combining contaminated material of less than one-half inch in particle size with water in an amount of approximately 0 to 500 parts by weight per 1000 parts by weight of contaminated material, catalysts, wherein one catalyst is metallic iron which is provided in an amount of approximately 2 to 100 parts by weight per 1000 parts by weight of contaminated material, and a second catalyst, wherein the second catalyst is nano-titania which is provided in an amount of approximately 2 to 100 parts by weight per 1000 parts by weight of contaminated material, surfactant, wherein the surfactant is bi-terpene which is provided in an amount of approximately 10 to 100 parts by weight per 1000 parts by weight of contaminated material, and a first oxidant other than ozone wherein the first oxidant is hydrogen peroxide which is provided as a 50% solution in an amount of approximately 10 to 50 parts by weight per 1000 parts by weight of contaminated material, to form a mixture;

mixing the mixture; and adding ozone gas to the mixture in an amount of approximately 0.001 to 3.0 parts by weight per 1 part by weight of aromatic hydrocarbons in the material.

30. A method for remediating material contaminated with aromatic hydrocarbons, comprising: combining material contaminated with aromatic hydrocarbons, catalyst, and a first oxidant other than ozone, to form a mixture, wherein said mixture includes at least about 10 parts by weight of said first oxidant per 1000 parts by weight of contaminated material; mixing the mixture; and adding ozone gas to the mixture to oxidize and degrade said aromatic hydrocarbons, wherein the catalyst comprises metallic iron and nano-titania and is located on impellor blades, baffles, metal baffles, ceramic baffles, vanes, paddles, meshes, grids, gratings, beds, deflectors, reaction vessel walls or combinations thereof.

* * * * *

UNITED STATES PATENT AND TRADEMARK OFFICE
CERTIFICATE OF CORRECTION

PATENT NO. : 5,849,201

DATED : DECEMBER 15, 1998

INVENTOR(S) : JOHN P. BRADLEY

Figure 6A:
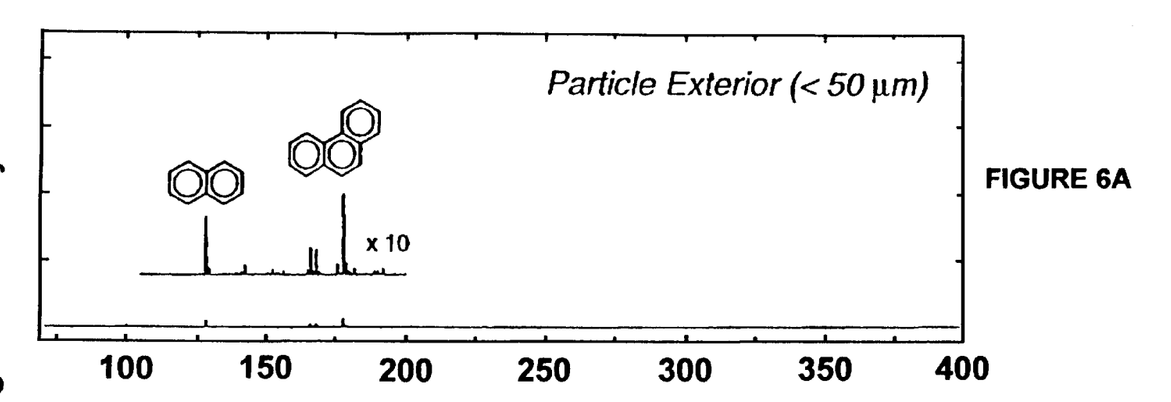
Figure 6B:
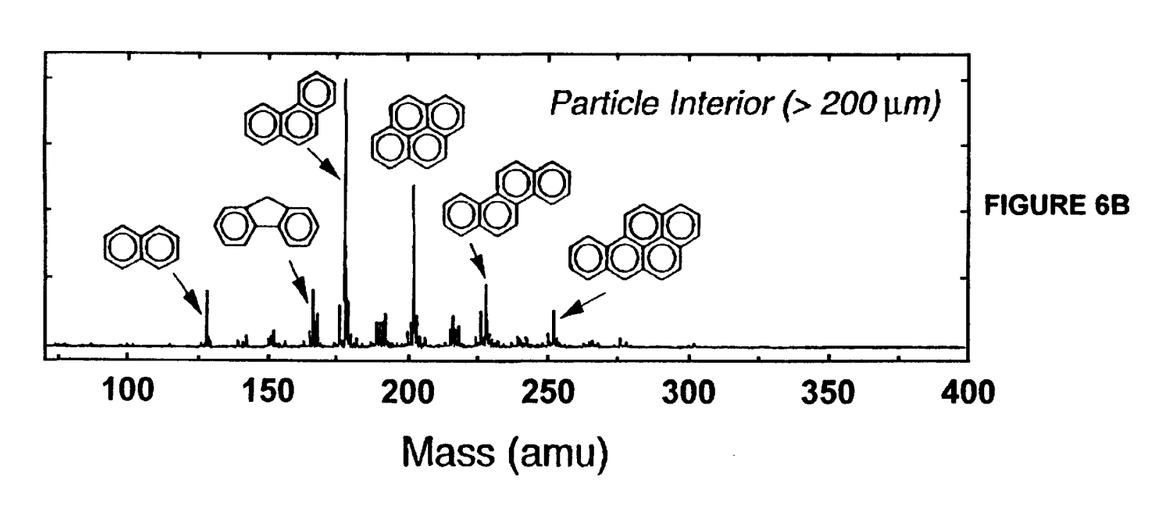

It is certified that error appears in the above-identified patent and that said Letters Patent is hereby corrected as shown below:

Please delete Figures 6A and 6B.

At column 2, line 58, please delete "phenathrene" and insert therefor --phenanthrene--.

At column 4, line 62, before the word "follows", please insert therefor --as--.

At column 7, line 15, please delete "$TiO_2as$" and insert therefor --$TiO_2$ as--.

At column 10, line 46, please delete "$Fe^0$" and insert therefor --$Fe^o$--.

At column 10, line 46, please delete "$Fe^{n+}$" and insert therefor --$Fe^{n+}$--.

At column 10, line 48, please delete "$Fe^0$" and insert therefor --$Fe^o$--.

In Claim 14, after the words "wherein the", please delete "is".

Signed and Sealed this

Seventh Day of September, 1999

*Attest:*

Q. TODD DICKINSON

*Attesting Officer*   *Acting Commissioner of Patents and Trademarks*